United States Patent
Guo

(10) Patent No.: US 8,031,689 B2
(45) Date of Patent: Oct. 4, 2011

(54) METHOD AND RELATED APPARATUS FOR HANDLING RE-ESTABLISHMENT OF RADIO LINK CONTROL ENTITY IN A WIRELESS COMMUNICATIONS SYSTEM

(75) Inventor: Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 201 days.

(21) Appl. No.: 12/121,781

(22) Filed: May 15, 2008

(65) Prior Publication Data

US 2008/0285584 A1 Nov. 20, 2008

Related U.S. Application Data

(60) Provisional application No. 60/938,705, filed on May 18, 2007.

(51) Int. Cl.
*H04J 3/16* (2006.01)
(52) U.S. Cl. .......................... 370/346; 370/469
(58) Field of Classification Search .......... 370/329, 370/229, 346, 469; 455/67.11
See application file for complete search history.

(56) References Cited

U.S. PATENT DOCUMENTS

| | | | |
|---|---|---|---|
| 7,130,295 B2 | 10/2006 | Kim | |
| 7,391,758 B2 | 6/2008 | Matusz | |
| 7,400,893 B2 | 7/2008 | Yi | |
| 2003/0007480 A1 | 1/2003 | Kim | |
| 2004/0153896 A1* | 8/2004 | Jang | 714/701 |
| 2006/0072494 A1 | 4/2006 | Matusz | |
| 2006/0251105 A1 | 11/2006 | Kim | |
| 2006/0281413 A1* | 12/2006 | Burbidge et al. | 455/67.11 |
| 2007/0047582 A1 | 3/2007 | Malkamäki | |
| 2007/0064599 A1* | 3/2007 | Jiang | 370/229 |
| 2007/0064600 A1* | 3/2007 | Jiang | 370/229 |
| 2007/0064601 A1* | 3/2007 | Jiang | 370/229 |
| 2007/0064602 A1* | 3/2007 | Jiang | 370/229 |
| 2007/0110101 A1* | 5/2007 | Wu | 370/469 |
| 2007/0183328 A1* | 8/2007 | Jiang | 370/232 |
| 2008/0043651 A1 | 2/2008 | Okamoto | |
| 2008/0069142 A1* | 3/2008 | Wu | 370/469 |
| 2008/0186936 A1 | 8/2008 | Chun | |
| 2008/0192748 A1 | 8/2008 | Kim | |
| 2008/0212561 A1* | 9/2008 | Pani et al. | 370/346 |

(Continued)

FOREIGN PATENT DOCUMENTS

JP 2002125004 A 4/2002

(Continued)

OTHER PUBLICATIONS

3GPP TS 25.322 V7.2.0 (Sep. 2006), "Radio Link Control (RLC) Protocol Specification (Release 7)".

(Continued)

*Primary Examiner* — Hassan Kizou
*Assistant Examiner* — Emmanuel Maglo
(74) *Attorney, Agent, or Firm* — Klein, O'Neill & Singh, LLP

(57) ABSTRACT

A method for handling re-establishment of a radio link control entity having a transmitting side and a receiving side in a wireless communications system includes storing a plurality of control protocol data units, and reserving a poll super field in the plurality of control protocol data units when only the receiving side is re-established.

12 Claims, 5 Drawing Sheets

U.S. PATENT DOCUMENTS

2009/0028126 A1* 1/2009 Meylan .................. 370/346

FOREIGN PATENT DOCUMENTS

| KR | 1020070033297 | 3/2007 |
| KR | 1020080073440 | 8/2008 |
| WO | 2005/109778 A1 | 11/2005 |
| WO | 2006118418 A2 | 11/2006 |
| WO | WO 2007023364 A1 | 3/2007 |
| WO | 2007039023 A1 | 4/2007 |
| WO | 2005048517 A1 | 3/2010 |

OTHER PUBLICATIONS

R2-072280, "Using special value of HE field to indicate end of an SDU for RLC AM", Ericsson, Nokia, NSN, Samsung, 3GPP TSG-RAN WG2#58, May 7, 2007.

R2-072308, "Introduction of improved L2 support for high data rates", Ericsson, 3GPP TSG-RAN WG2#57, Feb. 12-16, 2007.

3GPP: "ETSI TS 125 322 V7.4.0 (Oct. 2007) Universal Mobile Telecommunications System (UMTS); Radio Link Control (RLC) protocol specification (3GPP TS 25.322 version 7.4.0 Release 7)" ETSI Standards, LIS, Sophia Antipolis Cedex, France, vol. 3-R2, No. V7.4.0, XP014040006, Oct. 1, 2007.

Asustek: "R2-072420; Correction on POLL SUFI" 3GPP TSG-RAN WG2 Meeting #58BIS, [Online], Jun. 25-29, 2007, pp. 1-5, XP002495307, Orlando, USA.

Asustek: "R2-073099; Correction on POLL SUFI" 3GPP TSG-RAN WG2 Meeting #59, [Online], Aug. 20-24, 2007, pp. 1-4, XP002495308, Athens, Greece.

"Universal Mobile Telecommunications System (UMTS); Radio Link Control (RLC) protocol specification (3GPP TS 25.322 version 7.3.0 Release 7); ETSI TS 125 322", Jun. 1, 2007, vol. 3-R2, No. V7.3.0, XP014040005, ISSN: 0000-0001, ETSI Standards, LIS, Sophia Antipolis Cedex, France.

Asustek, "R2-072421, Special HE value setting" 3GPP TSG-RAN WG2 Meeting #58bis, [Online], Jun. 25-29, 2007, pp. 1-3, XP002503779, Orlando, USA.

Asustek, "R2-073101, Special HE value setting" 3GPP TSG-RAN WG2 Meeting #59, [Online], Aug. 20-24, 2007, pp. 1-3, XP002503780, Athens, Greece.

Notice of Allowance on corresponding JP patent application No. 2008-130161 issued on Jan. 4, 2011.

Notice of Allowance on corresponding JP patent application No. 2008-130160 issued on Dec. 22, 2010.

* cited by examiner

METHOD AND RELATED APPARATUS FOR HANDLING RE-ESTABLISHMENT OF RADIO LINK CONTROL ENTITY IN A WIRELESS COMMUNICATIONS SYSTEM

CROSS REFERENCE TO RELATED APPLICATIONS

This application claims the benefit of U.S. Provisional Application No. 60/938,705, filed on May 18, 2007 and entitled "Method and apparatus for POLL SUFI and special value of HE field clarifications in a wireless communication system", the contents of which are incorporated herein by reference.

BACKGROUND OF THE INVENTION

1. Field of the Invention

The present invention relates to a method and apparatus for handling re-establishment of a radio link control entity in a wireless communications system, and more particularly, to a method and apparatus for timely polling status of a peer radio link control entity, and preventing waste of system resource.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

The Access Stratum (AS) of the 3G mobile communications system comprises various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different modes according to different transmission quality requirements, such as Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In AM, the RLC layer is a combination of a transmitting side and a receiving side. The transmitting side and the receiving side each process transmission and reception in the RLC layer, and both sides can share system resources. In some circumstances, the RLC layer must be re-established, e.g. when starting a re-establishment procedure. The prior art re-establishes the RLC layer by re-establishing the transmitting side or the receiving side.

Directed at operations corresponding to re-establishing the RLC layer, the related communications protocol specification discloses that if only the receiving side is re-established, the prior art will discard all control PDUs (Protocol Data Unit) except MRW SUFI (Move Receiving Window Super Field). In other words, a POLL SUFI (Poll Super Field) will be discarded. The POLL SUFI is utilized for polling status of the peer RLC entity. Therefore, when only the receiving side is re-established, the prior art cannot timely request a status report from the peer RLC entity.

Similarly, the related communications protocol specification further discloses that if only the transmitting side of the RLC entity is re-established, the prior art will discard MRW SUFI, RESET PDU, and RESET ACK PDU. In other words, the POLL SUFI will not be discard in this case, causing transmission of an unnecessary STATUS PDU or piggybacked STATUS PDU and waste of system resource.

SUMMARY OF THE INVENTION

According to the claimed invention, a method for handling re-establishment of a radio link control entity having a transmitting side and a receiving side in a wireless communications system comprises storing a plurality of control protocol data units, and reserving a poll super field in the plurality of control protocol data units when only the receiving side is re-established.

According to the claimed invention, a communications device for handling re-establishment of a radio link control entity having a transmitting side and a receiving side in a wireless communications system comprises a control circuit for realizing functions of the communications device, a processor installed in the control circuit, for executing a program code to command the control circuit, and a memory installed in the control circuit and coupled to the processor for storing the program code. The program code comprises storing a plurality of control protocol data units, and reserving a poll super field in the plurality of control protocol data units when only the receiving side is re-established.

According to the claimed invention, a method for handling re-establishment of a radio link control entity having a transmitting side and a receiving side in a wireless communications system comprises storing a plurality of control protocol data units, and discarding a poll super field in the plurality of control protocol data units when only the transmitting side is re-established.

According to the claimed invention, a communications device for handling re-establishment of a radio link control entity having a transmitting side and a receiving side in a wireless communications system comprises a control circuit for realizing functions of the communications device, a processor installed in the control circuit, for executing a program code to command the control circuit, and a memory installed in the control circuit and coupled to the processor for storing the program code. The program code comprises storing a plurality of control protocol data units, and discarding a poll super field in the plurality of control protocol data units when only the transmitting side is re-established.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
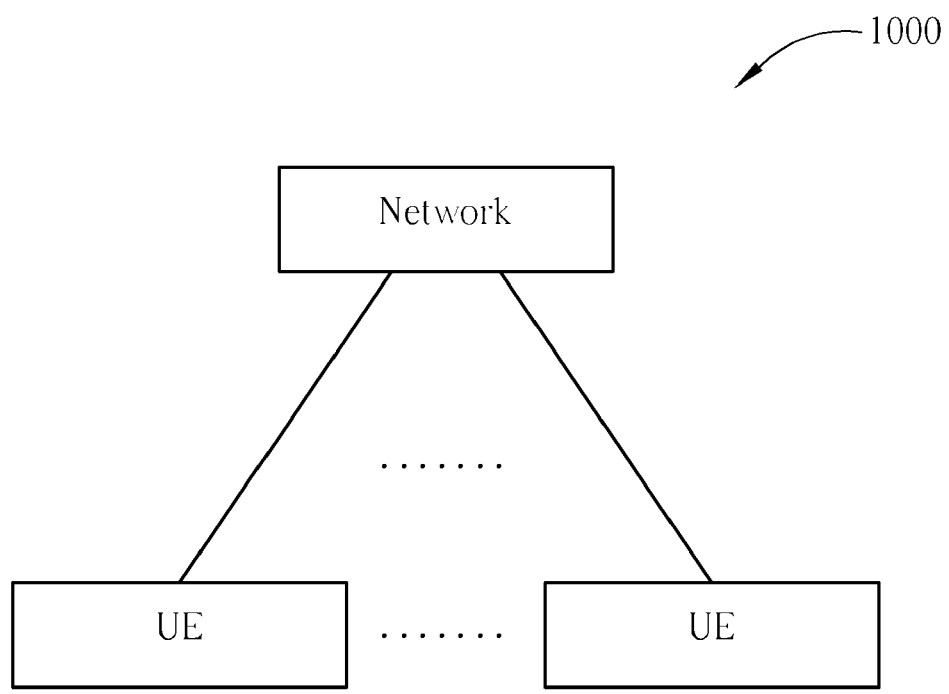
FIG. 5 is a schematic diagram of a wireless communications system.

Please refer to FIG. 5, which illustrates a schematic diagram of a wireless communications system 1000. The wireless communications system 1000 can be a 3G mobile telecommunications system, an LTE (long-term evolution) system or other mobile communications systems, and is briefly composed of a network and a plurality of UEs. In FIG. 5, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 1:
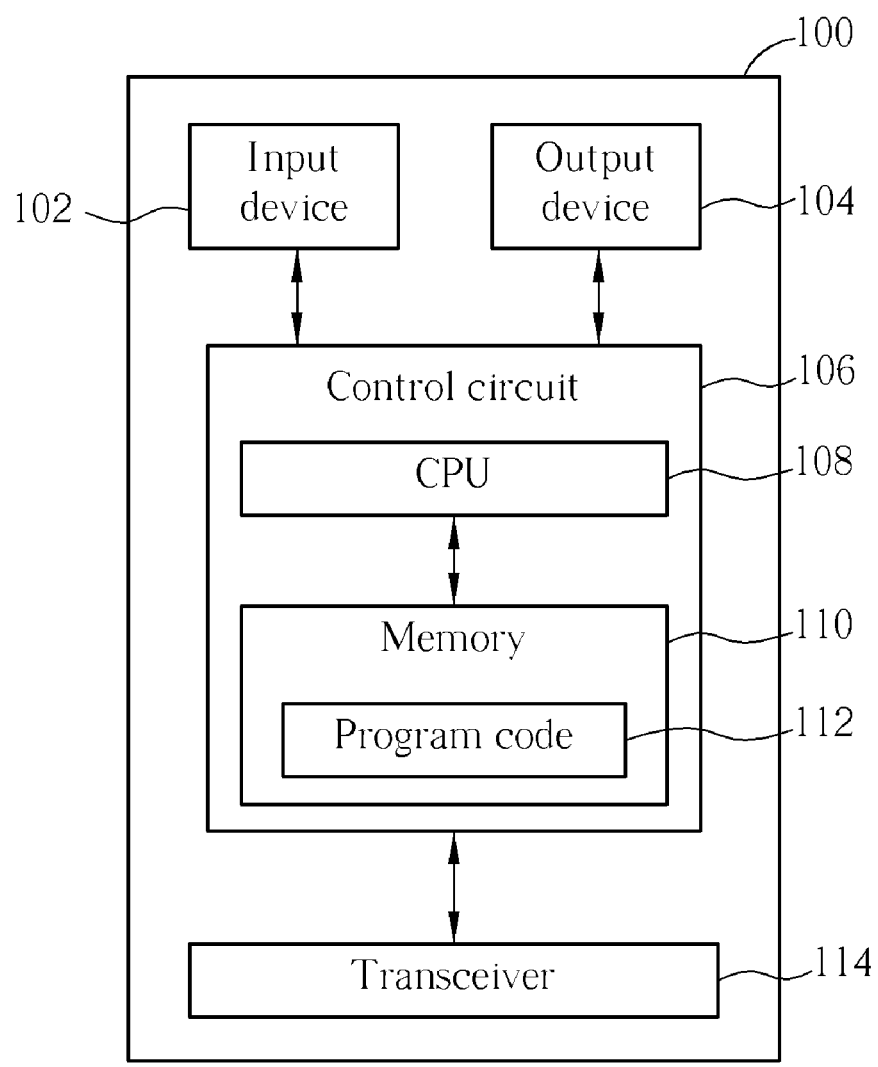
FIG. 1 is a function block diagram of a wireless communications device.

Please refer to FIG. 1, which is a functional block diagram of a wireless communications device 100. The communications device 100 is utilized for realizing the network or the UEs in FIG. 5. For the sake of brevity, FIG. 1 only shows an input device 102, an output device 104, a control circuit 106, a central processing unit (CPU) 108, a memory 110, a program code 112, and a transceiver 114 of the wireless communications device 100. In the wireless communications device 100, the control circuit 106 executes the program code 112 in the memory 110 through the CPU 108, thereby controlling an operation of the wireless communications device 100. The wireless communications device 100 can receive signals input by a user through the input device 102, such as a keyboard, and can output images and sounds through the output device 104, such as a monitor or speakers. The transceiver 114 is used to receive and transmit wireless signals, transmitting received signals to the control circuit 106, and outputting signals generated by the control circuit 106 wirelessly. From a perspective of a communications protocol framework, the transceiver 114 can be seen as a first portion of a first layer, and the control circuit 106 can be utilized to realize functions of Layer 2 and Layer 3.

Figure 2:
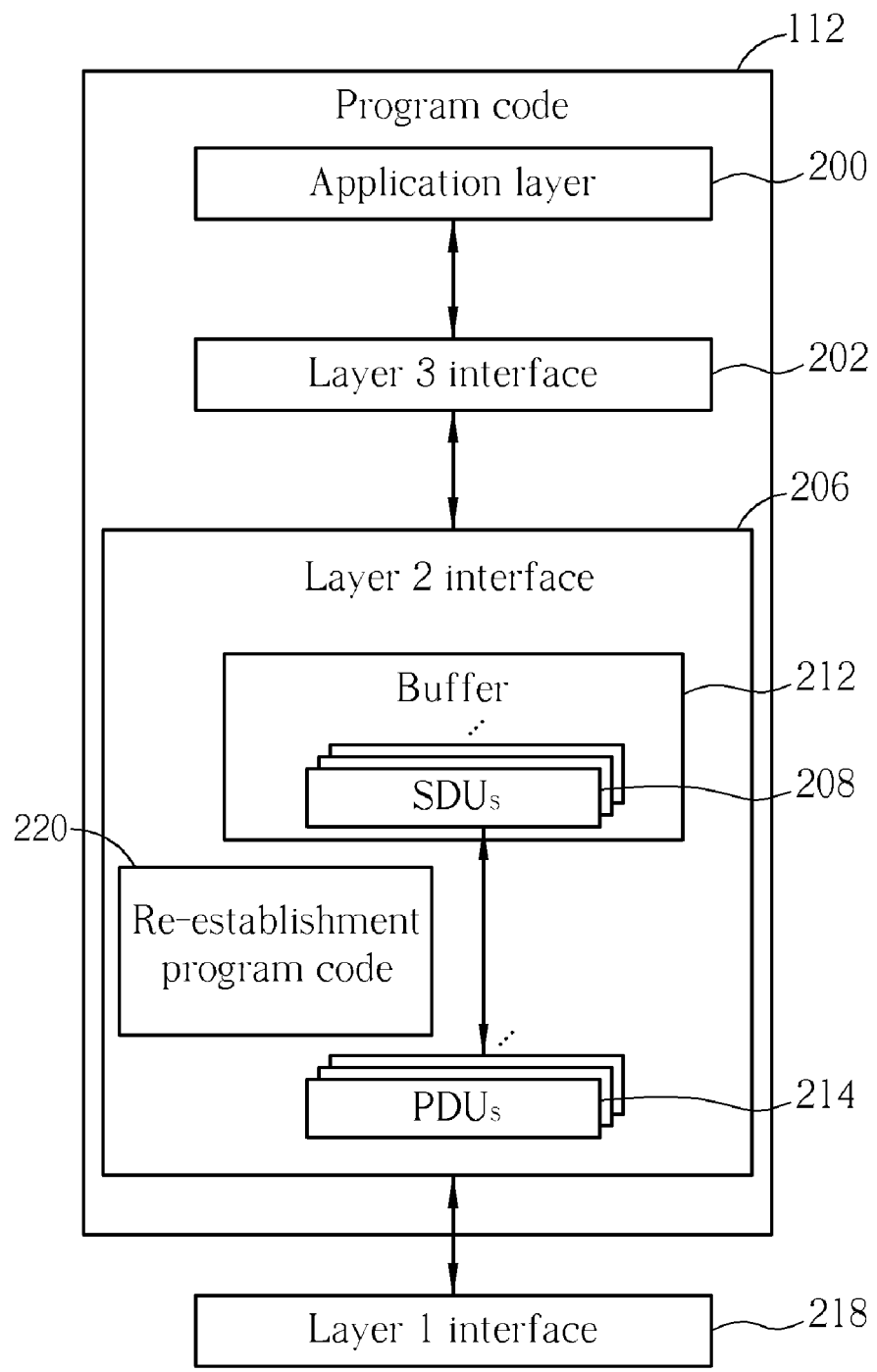
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs (Service Data Units) 208 according to data outputted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then outputted as PDUs 214 to the Layer 2 interface 206. The Layer 2 interface 206 restores the PDUs 214 to SDUs 208 and stores the SDUs 208 in the buffer 212. Last, the Layer 2 interface 206 transmits the SDUs 208 stored in the buffer 212 to the Layer 3 interface 202.

When the wireless communications device 100 operates in AM, the Layer 2 interface 206 is a combination of a transmitting side and a receiving side. The transmitting side and the receiving side respectively represent the transmitting and receiving portions of the RLC layer. In some circumstances, the program code 112 must re-establish the Layer 2 interface 206. Therefore, the embodiment of the present invention provides a re-establishment program code 220 for accurately re-establishing the Layer 2 interface 206.

Figure 3:
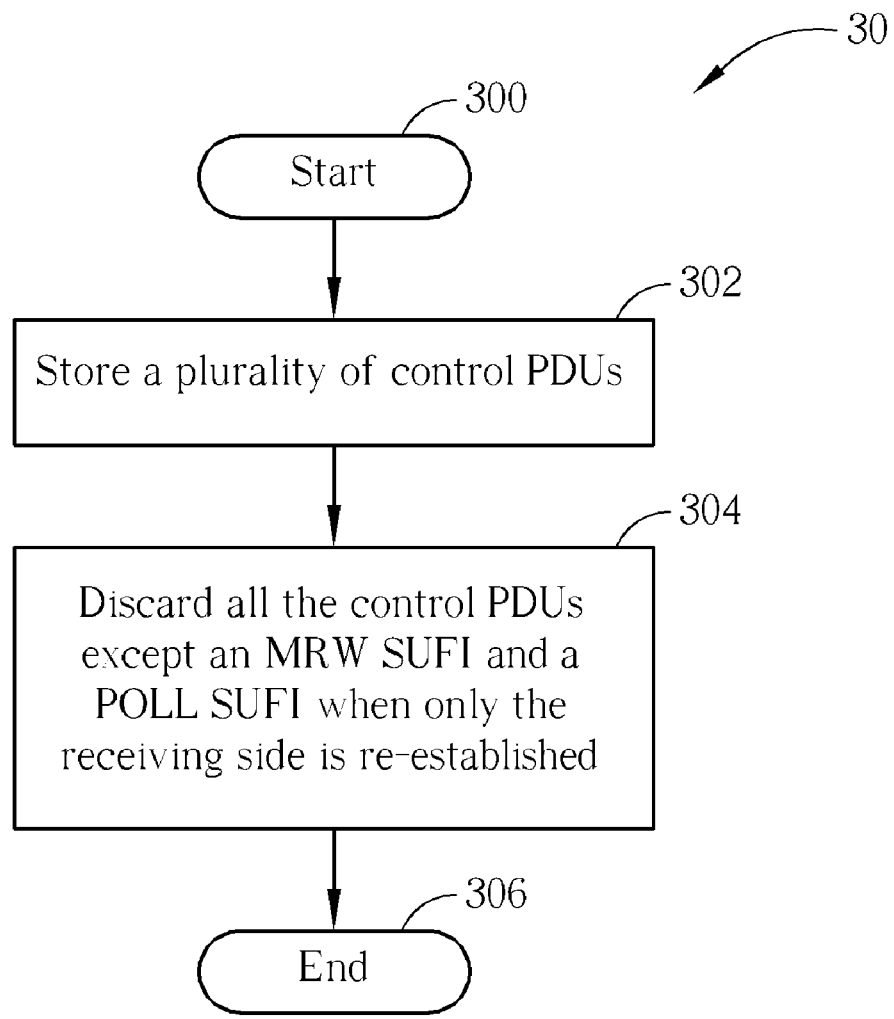
FIG. 3 and FIG. 4 are flowcharts of processes according to embodiments of the present invention.

Please refer to FIG. 3, which is a diagram of a process 30 according to an embodiment of the present invention. The process 30 is utilized to re-establish an RLC entity in the wireless communications system 1000, and can be compiled into the re-establishment program code 220. The process 30 comprises steps of:

Step 300: Start.
Step 302: Store a plurality of control PDUs.

Step 304: Discard all the control PDUs except an MRW SUFI and a POLL SUFI when only the receiving side is re-established.
Step 306: End.

According to the process 30, when only the receiving side is re-established, the embodiment of the present invention reserves MRW SUFI and POLL SUFI, and discards all the other control PDUs, such as an acknowledgement status report, WINDOW SUFI (Window Size Super Field), MRW_ACK SUFI (Move Receiving Window Acknowledgement Super Field), RESET PDU, and RESET ACK PDU. In such a situation, since POLL SUFI is not discarded, when only the receiving side is re-established, the embodiment of the present invention can timely request a status report from the peer RLC entity, so as to poll the status of the peer RLC entity.

Therefore, via the process 30, when only the receiving side is re-established, the embodiment of the present invention can keep POLL SUFI from being discarded, so as to timely poll the status of the peer RLC entity.

Figure 4:
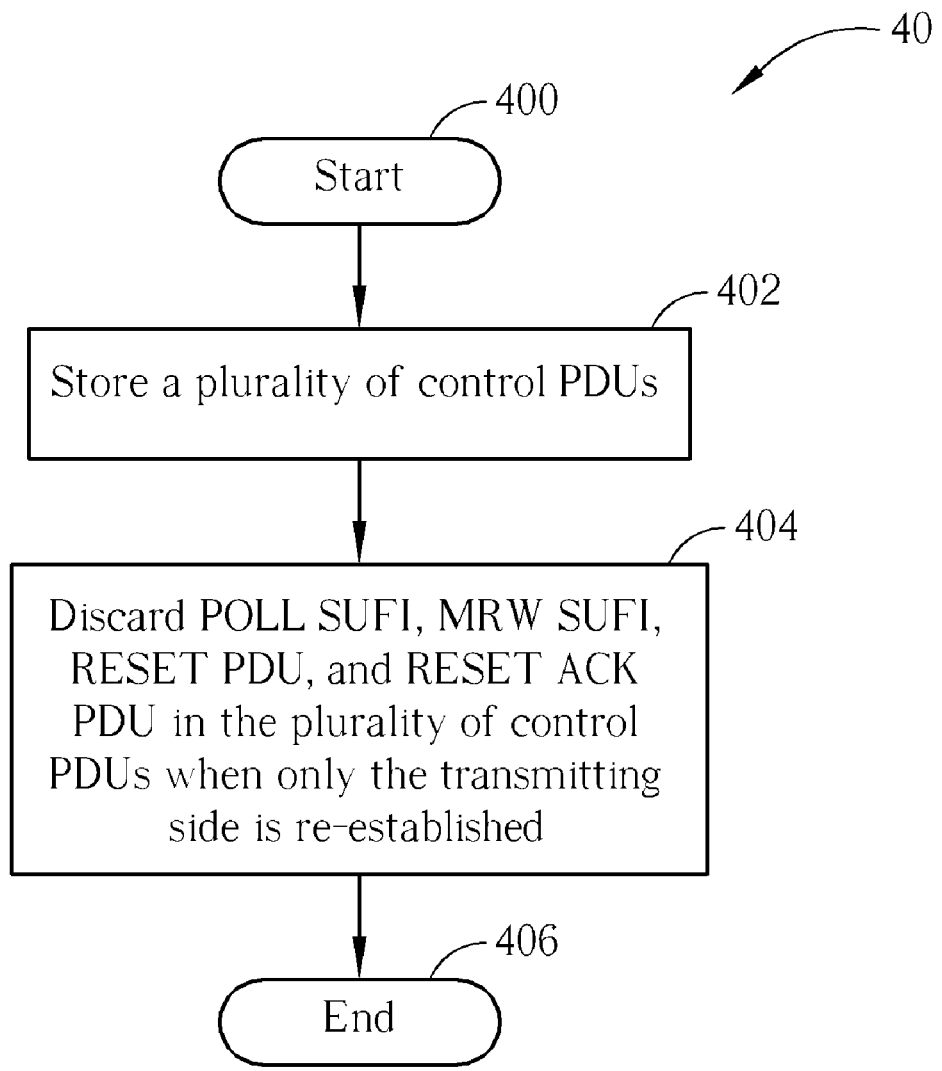

Please refer to FIG. 4, which is a diagram of a process 40 according to an embodiment of the present invention. The process 40 is utilized to re-establish an RLC entity in the wireless communications system 1000, and can be compiled into the re-establishment program code 220. The process 40 comprises steps of:

Step 400: Start.
Step 402: Store a plurality of control PDUs.
Step 404: Discard POLL SUFI, MRW SUFI, RESET PDU, and RESET ACK PDU in the plurality of control PDUs when only the transmitting side is re-established.
Step 406: End.

According to the process 40, when only the transmitting side is re-established, the embodiment of the present invention discards POLL SUFI, MRW SUFI, RESET PDU, and RESET ACK PDU, and reserves other control PDUs, such as an acknowledgement status report, WINDOW SUFI, and MRW_ACK SUFI. In such a situation, since POLL SUFI will be discarded, when only the transmitting side is re-established, the embodiment of the present invention can prevent transmission of an unnecessary STATUS PDU or piggybacked STATUS PDU, so as to reduce waste of system resource.

Therefore, via the process 40, when only the transmitting side is re-established, the embodiment of the present invention discards POLL SUFI, to prevent transmission of an unnecessary STATUS PDU or piggybacked STATUS PDU.

In summary, the embodiment of the present invention provides processes for handling POLL SUFI when only the receiving side is re-established or only the transmitting side is re-established, so as to timely poll status of the peer RLC entity, and prevent waste of system resource.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for handling re-establishment of a radio link control entity having a transmitting side and a receiving side in a wireless communications system comprising:
  storing a plurality of control protocol data units including a status protocol data unit corresponding to the transmitting side and the status protocol data unit containing a poll super field; and reserving the poll super field in the plurality of control protocol data units when only the receiving side is re-established.

2. The method of claim 1 further comprising reserving a move receiving window super field in the plurality of control protocol data units.

3. The method of claim 1 further comprising discarding an acknowledgement status report, a window size super field, a move receiving window acknowledgement super field, a reset protocol data unit, and a reset acknowledgement protocol data unit in the plurality of control protocol data units.

4. A communications device for handling re-establishment of a radio link control entity having a transmitting side and a receiving side in a wireless communications system comprising:
   a control circuit for realizing functions of the communications device;
   a processor installed in the control circuit, for executing a program code to command the control circuit; and
   a memory installed in the control circuit and coupled to the processor for storing the program code;
   wherein the program code comprises:
      storing a plurality of control protocol data units including a status protocol data unit corresponding to the transmitting side and the status protocol data unit containing a poll super field; and
      reserving the poll super field in the plurality of control protocol data units when only the receiving side is re-established.

5. The communications device of claim 4, wherein the program code further comprises reserving a move receiving window super field in the plurality of control protocol data units.

6. A communications device of claim 4, wherein the program code further comprises discarding an acknowledgement status report, a window size super field, a move receiving window acknowledgement super field, a reset protocol data unit, and a reset acknowledgement protocol data unit in the plurality of control protocol data units.

7. A method for handling re-establishment of a radio link control entity having a transmitting side and a receiving side in a wireless communications system comprising:

storing a plurality of control protocol data units including a status protocol data unit corresponding to the transmitting side and the status protocol data unit containing a poll super field; and discarding the poll super field in the plurality of control protocol data units when only the transmitting side is re-established.

8. The method of claim 7 further comprising discarding a move receiving window super field, a reset protocol data unit, and a reset acknowledgement protocol data unit in the plurality of control protocol data units.

9. The method of claim 7 further comprising reserving an acknowledgement status report, a window size super field, and a move receiving window acknowledgement super field in the plurality of control protocol data units.

10. A communications device for handling re-establishment of a radio link control entity having a transmitting side and a receiving side in a wireless communications system comprising:
    a control circuit for realizing functions of the communications device;
    a processor installed in the control circuit, for executing a program code to command the control circuit; and
    a memory installed in the control circuit and coupled to the processor for storing the program code;
    wherein the program code comprises:
       storing a plurality of control protocol data units including a status protocol data unit corresponding to the transmitting side and the status protocol data unit containing a poll super field; and
       discarding the poll super field in the plurality of control protocol data units when only the transmitting side is re-established.

11. The communications device of claim 10, wherein the program code further comprises discarding a move receiving window super field, a reset protocol data unit, and a reset acknowledgement protocol data unit in the plurality of control protocol data units.

12. The communications device of claim 10, wherein the program code further comprises reserving an acknowledgement status report, a window size super field, and a move receiving window acknowledgement super field in the plurality of control protocol data units.

* * * * *